G. A. LYON.
TIRE HOLDER.
APPLICATION FILED MAR. 19, 1920.
1,386,187. Patented Aug. 2, 1921.
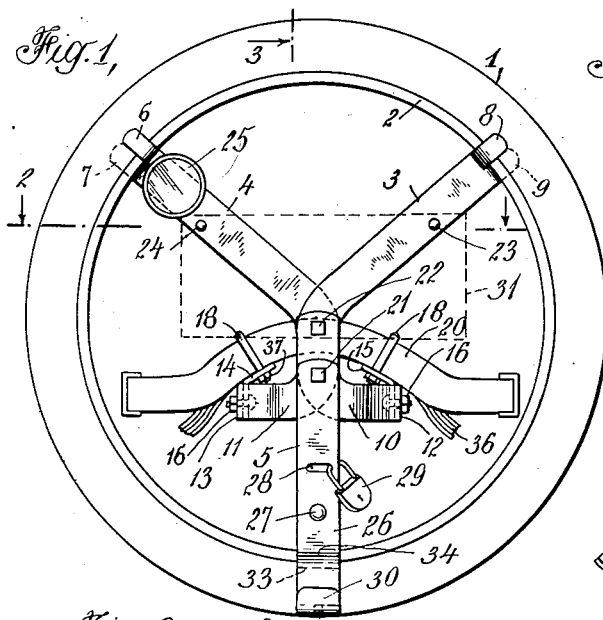
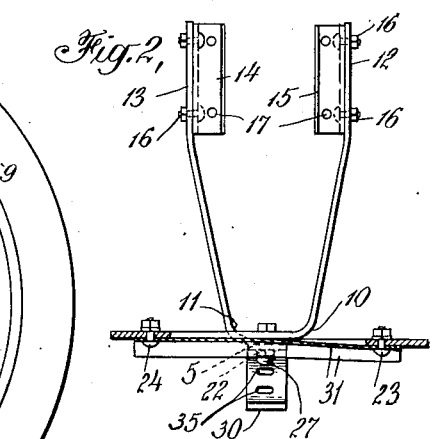
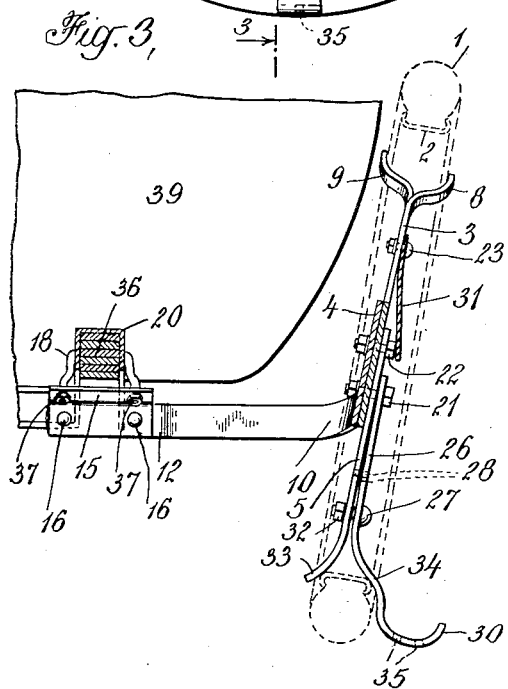
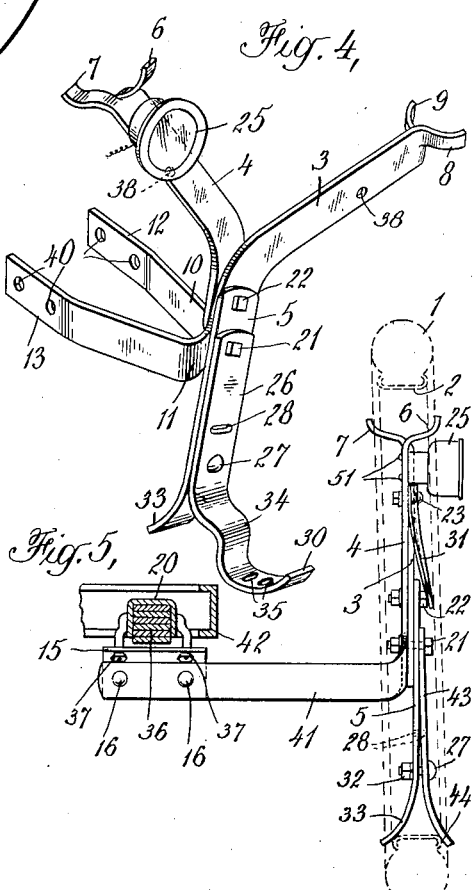
Inventor
George Albert Lyon
By his Attorney
Harry L. Duncan

UNITED STATES PATENT OFFICE.

GEORGE ALBERT LYON, OF PHILADELPHIA, PENNSYLVANIA.

TIRE-HOLDER.

1,386,187.  Specification of Letters Patent.  Patented Aug. 2, 1921.

Application filed March 19, 1920. Serial No. 367,044.

*To all whom it may concern:*

Be it known that I, GEORGE ALBERT LYON, a citizen of the United States, and resident of Philadelphia, county of Philadelphia, and State of Pennsylvania, have made a certain new and useful Invention Relating to Tire-Holders, of which the following is a specification, taken in connection with the accompanying drawing.

This invention relates especially to tire holders adapted to be used with Ford or similar automobiles and which may be substantially composed of a plurality of resilient flat metal strips having attaching arms or members adapted to be connected to the rear spring or other convenient part of the automobile and having overlapping junction portions located substantially centrally of the tire from which the strips diverge and extend upward to form tire supporting arms which may have slit and oppositely bent supporting fingers to engage the tire rims. A tire holding arm of similar spring strip may be bolted or secured to the junction portions to which a movable retainer arm may also be secured, one or both of these depending arms being preferably formed with wedging clamping portions or ends so as to engage the lower parts of the tire rims and force them downward when these depending arms are brought together as by a clamping bolt, the retainer arm being preferably formed with a rearwardly extending curved portion or supporting socket in which an extra tire may be temporarily or otherwise supported. The tire supporting arms may advantageously be formed with license bracket holes or supporting means and one of these arms may also support the usual tail light adjacent the license plate so that the tire holder substantially without additional portions or parts may serve as a tail light and license plate bracket.

In the accompanying drawing showing in a somewhat diagrammatic way illustrative embodiments of this invention—

Figure 1 is a rear view showing one form of the tire holder when secured to an automobile.

Fig. 2 is a partial plan view thereof taken substantially along the line 2—2 of Fig. 1.

Fig. 3 is a corresponding side sectional view taken along the line 3—3 of Fig. 1 and showing the tire in connection with a touring body automobile.

Fig. 4 is a perspective view of the assembled but disconnected tire holder; and

Fig. 5 is a side sectional view showing another illustrative tire holder secured to a runabout automobile.

The tire holder may comprise a pair of flat resilient metal strips which preferably though not necessarily are formed of tempered spring steel strip, about an inch and a half or two inches wide and a quarter to three-eighths of an inch thick giving good results. These strips are formed preferably with integral attaching arms to be connected or clamped to the automobile and a desirable arrangement is to bolt or clamp these strips to angle brackets which may be bolted to the rear springs by the usual spring U-bolts securing the springs to the frame channels of the machine as is indicated in Figs. 3 and 5. These angle brackets 14, 15 are thus firmly and strongly held in place and their depending flanges may as indicated in Figs. 1 and 3 be formed with holes through which the clamping bolts 16 may extend so as to pass through corresponding holes 40 and secure in position the ends 12, 13 of the attaching arms 10, 11. By having the junction portions at an oblique angle to the attaching arms these arms may be substantially horizontal while the supporting arms and tire 1 may extend substantially parallel to the rear of the touring body 39 of the automobile as seen in Fig. 3. As shown in Figs. 2 and 4 these attaching arms may be bent somewhat toward each other and be formed with bent upwardly extending junction portions of which the flat faces engage adjacent the central part of the tire or rim. These same resilient metal strips may diverge and extend upward to form the tire supporting arms 3, 4 which may be located on opposite sides of the junction portions from the connected attaching arms or members in this cross-over or saw-horse type of the device. The upper ends of these tire supporting arms which may extend substantially radially from about the center of the tire 1 and rim 2 at an angle of about 120° apart more or less may be split and oppositely bent so as to form the tire supporting fingers 6, 7, 8 and 9 of such width as to hold one or more tires and the attached demountable rims and at the same time exert a suitable lateral alining action thereon so that the tires cannot shake or move transversely.

Another similar flat strip may form a depending tire holding arm 5 which is preferably rigidly held or clamped against the junction portions of the other strips by the junction bolts 21, 22 which may pass through all of these junction portions and also, if desired, through a similar retainer arm or member 26 which may, however, be engaged by only one of these bolts, if desired, so as to have a swinging movement about this lower bolt 21. The lower portions of these two coöperating holding and retainer arms may be formed with wedging clamping ends 33, 34, one or both of which may be curved outward to have a clamping action on the tire rim and tightly clamp and simultaneously force it downward against the two upper points of support when this retainer arm is forced inward against the coöperating holding arm as by the bolt 27 when the nut 32 is screwed home. Suitable locking slots or apertures 28 may be formed in these depending arms through which may extend a padlock or fastening device 29 as indicated in Fig. 1. In some cases it is desirable to have this retainer arm formed with an additional end support or socketed portion 30 of such shape as to accommodate an additional tire and rim which may be clamped thereto as by straps passing through the strap or fastening holes 35 while additional straps may of course clamp the upper portion of this tire and rim to the tire already in place on the holder. In this way by practically no additional weight or expense an additional tire can be carried on the holder in emergencies.

This tire holder may also be advantageously used to support the usual license plate of the machine and for this purpose the diverging tire supporting arms 3, 4 may be formed with one or more holes or slots, such as 38 through which the bolts 23, 24 may pass to clamp in place the license plate 31. This license plate may as indicated in Fig. 3 engage at its lower edge one or more of the projecting junction bolts so as to force it backward into somewhat bent position which definitely prevents rattling or objectionable noise under running conditions. One of these tire supporting arms may also be formed with suitable apertures or holes through which may extend bolts or fastenings 51 for the tail light 25 so that it may be permanently or removably bolted or secured to the tire holder adjacent the license plate, thus obviating the necessity for any special license and tail light bracket.

Fig. 3 shows the way in which a tire holder of this construction may be connected to a touring body automobile and Fig. 5 shows a runabout type of tire holder having attaching arms, such as 41, which may extend out at substantially right angles to the diverging tire supporting arms 3, 4 so as to bring the tire into more vertical position. This tire holder may have the same general features of construction previously referred to, except that as indicated the retainer arm 43 may end in the wedging clamping portion 44 so as to avoid the rearward projection used in connection with the additional tire supporting socket 30 shown in Fig. 3. Either type of device may be readily disconnected and packed in small compass for shipment and sale and the device is so simple that the parts may readily be assembled into such relative position as is shown in Fig. 4 and then secured to the automobile by bolts passing through the holes 40 in the ends of the attaching arms especially where the automobile when assembled is provided with angle brackets, such as 14, 15 in connection with its rear spring.

This invention has been described in connection with a number of illustrative forms, proportions, parts, materials, arrangements and sizes, to the details of which disclosure the invention is not of course to be limited, since what is claimed as new and what is desired to be secured by Letters Patent is set forth in the appended claims.

1. In automobile tire holders, a pair of connected resilient strip members having upwardly and outwardly extending diverging tire supporting arms, a connected depending retainer arm and coöperating clamping means to hold the tire, said retainer arm being formed with a socketed supporting end to fit beneath and support an extra tire and attaching arms integral with said tire supporting arms and adapted to be connected to the rear spring of an automobile to securely support said tire holder therefrom.

2. In automobile tire holders, a pair of connected resilient strip members having upwardly and outwardly extending diverging tire supporting arms, a connected depending retainer arm and coöperating clamping means to hold the tire, said retainer arm being formed with a supporting end to support an extra tire.

3. In automobile tire holders, a plurality of diverging resilient strip members having considerably greater width than thickness and each having a junction portion, junction bolts to detachably connect said junction portions and hold them in substantially rigid relative position, license bracket holes formed in said tire supporting arms adjacent said junction portions to clamp a license plate to said arms and force the lower edge of said license plate outward by engagement with said junction bolts, means on one of said tire supporting arms to support a tail light adjacent said license plate, said retainer arm being formed with a socketed supporting end to fit beneath and support a tire, and resilient strip attaching arms integral with said tire supporting arms and angle brackets adapted to be connected to the rear spring of an automobile by the spring U bolts to be connected to said attaching arms and securely support said tire holder therefrom.

4. In automobile tire holders, a plurality of diverging resilient strip members having considerably greater width than thickness and each having a junction portion, junction bolts to detachably connect said junction portions and hold them in substantially rigid relative position, and resilient strip attaching arms integral with said tire supporting arms and angle brackets adapted to be connected to the rear spring of an automobile to be connected to said attaching arms and securely support said tire holder therefrom.

5. In automobile tire holders, members each having a junction portion, means to connect said junction portions and hold them in substantially rigid relative position, and resilient strip attaching arms integral with said tire supporting arms and brackets adapted to be connected to an automobile to be connected to said attaching arms and securely support said tire holder therefrom.

6. In automobile tire holders, an automobile having its transverse rear spring secured to the frame by U bolts, angle section brackets formed with holes engaged by said U bolts to be thereby secured to said frame and provide depending bracket flanges formed with attaching holes, a pair of spring strip members having considerably greater width than thickness and each having a junction portion and an outwardly extending tire supporting arm, a connected depending tire holding arm, license bracket holes formed in said tire supporting arms adjacent said junction portions to clamp a license plate to said arms, means on said tire supporting arms to support a tail light adjacent said license plate, and vertically rigid spring strip attaching arms integral with said tire supporting arms and formed with bolt holes to be detachably bolted to said depending bracket flanges.

7. In automobile tire holders an automobile having its transverse rear spring secured to the frame by U bolts, angle section brackets formed with holes engaged by said U bolts to be thereby secured to said frame and provide depending bracket flanges formed with attaching holes, a pair of spring strip members each having a junction portion and an outwardly extending tire supporting arm, a connected tire holding arm and vertically rigid spring strip attaching arms integral with said tire supporting arms and formed with bolt holes to be detachably bolted to said depending bracket flanges.

8. In automobile tire holders, an automobile having its transverse rear spring secured to the frame by bolts, brackets engaged by said bolts to be thereby secured to said frame and provide depending bracket flanges formed with attaching holes, members each having a junction portion and an outwardly extending tire supporting arm, a connected tire-holding arm and vertically rigid spring strip attaching arms connected with said tire supporting arms and formed with bolt holes to be detachably bolted to said depending bracket flanges.

9. In tire and tail light holders adapted for use with Ford or similar automobiles a pair of connected spring strip members each having an upwardly and outwardly extending tire supporting arm, tire supporting fingers formed on said tire supporting arms, a connected depending tire holding arm, a depending retainer arm movably secured at its upper end to said tire holding arm, license bracket holes formed in said tire supporting arms adjacent said junction portions to clamp a license plate to said arms and means engaging one of said tire supporting arms to support a tail light adjacent said license plate.

10. In tire and tail light holders adapted for use with Ford or similar automobiles, a pair of connected strip members each having an upwardly and outwardly extending tire supporting arm, means engaging said tire supporting arms adjacent said junction portions to clamp a license plate to said arms and a tail light secured directly to one of said supporting arms adjacent said license plate.

GEORGE ALBERT LYON.